(12) United States Patent
    Zhang

(10) Patent No.: US 10,924,774 B2
(45) Date of Patent: Feb. 16, 2021

(54) LIVE INTERACTIVE SYSTEM, METHOD, DEVICE AND COMPUTER READABLE STORAGE MEDIUM

(71) Applicant: Tencent Technology (Shenzhen) Company Limited, Shenzhen (CN)

(72) Inventor: Fuchun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/421,228

(22) Filed: May 23, 2019

(65) Prior Publication Data

US 2019/0281326 A1    Sep. 12, 2019

Related U.S. Application Data

(63) Continuation of application No. PCT/CN2018/079755, filed on Mar. 21, 2018.

(30) Foreign Application Priority Data

Mar. 27, 2017  (CN) .......................... 2017 1 0188808

(51) Int. Cl.
    *H04N 21/2187*    (2011.01)
    *H04L 29/06*     (2006.01)
    (Continued)

(52) U.S. Cl.
    CPC ..... *H04N 21/2187* (2013.01); *H04L 65/4092* (2013.01); *H04N 21/239* (2013.01);
    (Continued)

(58) Field of Classification Search
    CPC .. H04N 21/2187; H04N 21/239; H04N 21/24; H04N 21/25833; H04N 21/4882;
    (Continued)

(56) References Cited

U.S. PATENT DOCUMENTS 6,564,380 B1 *  5/2003  Murphy ................ H04N 5/232
                                                348/207.11
2014/0214986 A1  7/2014  Hwang et al.
(Continued)

FOREIGN PATENT DOCUMENTS

CN    105704502 A    6/2016
CN    106105244 A    11/2016
(Continued)

OTHER PUBLICATIONS

Tencent Technology, ISR PCT/CN2018/079755, Jun. 15, 2018, 2 pgs.
(Continued)

*Primary Examiner* — Oschta I Montoya
(74) *Attorney, Agent, or Firm* — Morgan, Lewis & Bockius LLP

(57) ABSTRACT

Embodiments of this application disclose a live streaming interaction system including: a server, an anchor terminal and at least one viewer terminal that have a first communication connection to the server, and intelligent hardware having a second communication connection to the anchor terminal. The server receives a first control request from the viewer terminal, generate a corresponding second control request, and sends the second control request to the anchor terminal. The anchor terminal forwards the second control request to the intelligent hardware. The intelligent hardware then performs a corresponding operation according to the second control request and returns live streaming data to the viewer terminal through the server. As such, the intelligent hardware can support a live streaming process between a user at the anchor terminal and a user at the viewer terminal that can remotely control the intelligent hardware by using the viewer terminal.

20 Claims, 3 Drawing Sheets

(51) Int. Cl.
*H04N 21/239* (2011.01)
*H04N 21/24* (2011.01)
*H04N 21/258* (2011.01)
*H04N 21/488* (2011.01)
*H04N 21/436* (2011.01)
*H04N 21/6332* (2011.01)
*H04N 21/6377* (2011.01)
*H04N 21/4788* (2011.01)
*H04N 21/437* (2011.01)

(52) U.S. Cl.
CPC ....... *H04N 21/24* (2013.01); *H04N 21/25833* (2013.01); *H04N 21/436* (2013.01); *H04N 21/437* (2013.01); *H04N 21/4788* (2013.01); *H04N 21/4882* (2013.01); *H04N 21/6332* (2013.01); *H04N 21/6377* (2013.01)

(58) Field of Classification Search
CPC ............. H04N 21/436; H04N 21/6332; H04N 21/6377; H04N 21/4788; H04N 21/437; H04L 65/4092
See application file for complete search history.

(56) References Cited

U.S. PATENT DOCUMENTS

2016/0044226 A1* 2/2016 Williams ............... H04N 7/181
348/211.3
2017/0171605 A1* 6/2017 Li ...................... H04N 21/8586

FOREIGN PATENT DOCUMENTS

| CN | 106375776 A | 2/2017 |
| --- | --- | --- |
| CN | 106470343 A | 3/2017 |

OTHER PUBLICATIONS

Tencent Technology, WO, PCT/CN2018/079755, Jun. 15, 2018, 4 pages.
Tencent Technology, IPRP, PCT/CN2018/079755, Oct. 1, 2019, 5 pages.

* cited by examiner

LIVE INTERACTIVE SYSTEM, METHOD, DEVICE AND COMPUTER READABLE STORAGE MEDIUM

CROSS-REFERENCE TO RELATED APPLICATIONS

This application is a continuation application of PCT/CN2018/079755, entitled "INTERACTION SYSTEM, METHOD AND APPARATUS FOR LIVE BROADCAST, AND COMPUTER-READABLE STORAGE MEDIUM" filed on Mar. 21, 2018, which claims priority to Chinese Patent Application No. 201710188808.0, filed with the Chinese Patent Office on Mar. 27, 2017, and entitled "LIVE STREAMING INTERACTION SYSTEM, METHOD, AND APPARATUS", all of which are incorporated herein by reference in their entireties.

FIELD OF THE TECHNOLOGY

Embodiments of this application relate to the field of video streaming technologies, and in particular, to a live streaming interaction system, method, and apparatus, and a computer-readable storage medium.

BACKGROUND OF THE DISCLOSURE

In a video streaming system, a viewer user is usually provided with a function to interact with an anchor user, to improve a feeling of participation of the viewer user.

In related technologies, in a process of viewing video streaming of an anchor user by using a client, a viewer user can send an interaction message to the anchor user by using the client, and the interaction message is usually text or an emoticon. After receiving the interaction message, the anchor user can communicate with the viewer user based on the interaction message.

SUMMARY

Embodiments of this application provide a live streaming interaction system, method, and apparatus, to resolve a problem of a relatively simple live streaming interaction form in the related technologies.

A first aspect of this application provides a live streaming interaction method performed at an anchor terminal having one or more processors and memory storing a plurality of programs to be executed by the one or more processors, wherein the anchor terminal has a first communication connection to a server, and a second communication connection to intelligent hardware, the method comprising:

receiving a second control request from the server via the first communication connection, wherein the server receives a first control request directed to the intelligent hardware from a viewer terminal and generates the second control request according to the first control request;

forwarding the second control request to the intelligent hardware via the second communication connection, wherein the intelligent hardware performs a corresponding operation according to the second control request and returns live streaming data associated with the corresponding operation to the anchor terminal via the second communication connection; and forwarding the live streaming data to the viewer terminal via the first communication connection.

A second aspect of this application provides a live streaming interaction system having an anchor terminal, a server that has a first communication connection to the anchor terminal, and intelligent hardware that has a second communication connection to the anchor terminal. The anchor terminal, the server and the intelligent hardware are configured to perform the aforementioned live streaming interaction method.

Still a third aspect of this application provides a non-transitory computer readable storage medium storing a plurality of machine readable instructions in connection with a live streaming interaction system including an anchor terminal, a server that has a first communication connection to the anchor terminal, and intelligent hardware that has a second communication connection to the anchor terminal. The anchor terminal, the server and the intelligent hardware are configured to perform the aforementioned live streaming interaction method.

It can be learned from the foregoing technical solutions that, the intelligent hardware connected to the anchor terminal is added, so that in a live streaming process of an anchor user, a viewer user can remotely control the intelligent hardware by using the viewer terminal, thereby implementing remote control of the intelligent hardware, enriching live streaming interaction forms, improving an interaction effect in the live streaming process, and increasing user stickiness.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1:
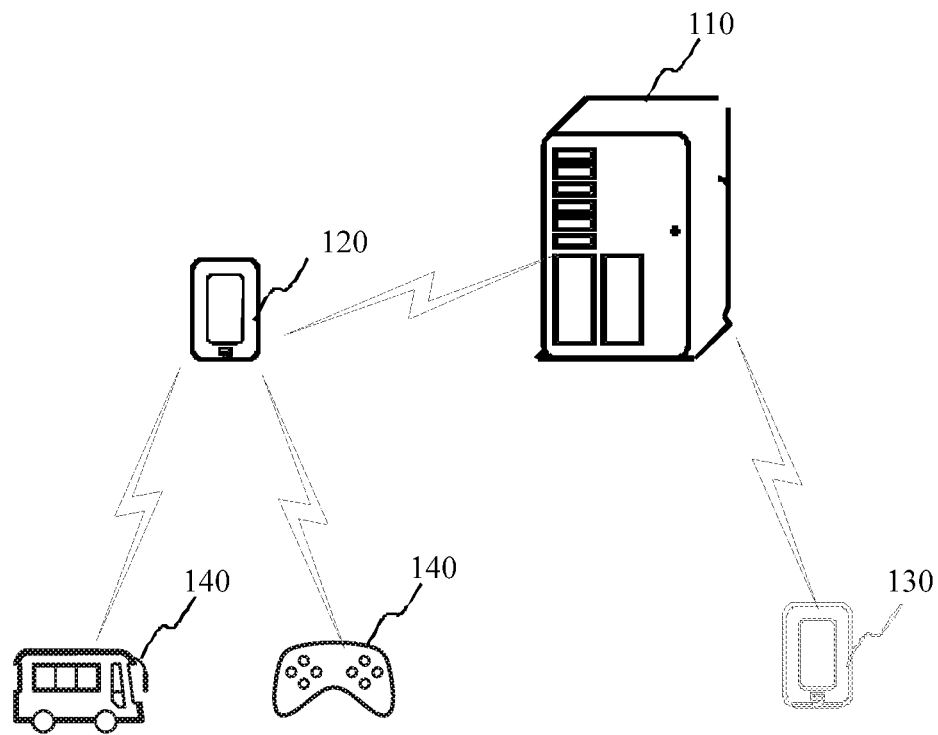
FIG. 1 is a schematic diagram of an implementation environment according to an embodiment of this application.

FIG. 1 is a schematic diagram of an implementation environment according to an embodiment of this application. The implementation environment may be a video streaming system. The implementation environment may include: a server 110, an anchor terminal 120, at least one viewer terminal 130, and intelligent hardware 140.

The server 110 is configured to provide a background service to a live streaming client. The server 110 may be one server, a server cluster including a plurality of servers, or a cloud computing service center.

The server 110 has a first communication connection to the anchor terminal 120 and the viewer terminal 130. The first communication connection is usually a network connection, for example, a wireless network connection or a wired network connection. It should be noted that to alleviate load pressure of the server 110, a content delivery network (CDN) may further be deployed between the server 110 and the viewer terminal 130. The CDN may include a plurality of CDN nodes deployed in a distributed manner. In this case, the server 110 may deliver live streaming data to the plurality of CDN nodes, and the viewer terminal 130 may obtain the live streaming data from a CDN node closest to the viewer terminal 130.

The anchor terminal 120 is used by an anchor user. An anchor client runs on the anchor terminal 120, and the anchor client has functions of collecting and publishing live streaming data. The viewer terminal 130 is used by a viewer user. A viewer client runs on the viewer terminal 130, and the viewer client has functions of downloading and playing live streaming data. The anchor terminal 120 and the viewer terminal 130 each may be an electronic device such as a mobile phone, a tablet computer, an e-reader, a multimedia playback device, a personal digital assistant (PDA), a wearable device, or a personal computer (PC).

The anchor terminal 120 has a second communication connection to the intelligent hardware 140. The second communication connection may be established in a wired manner or a wireless manner. For example, the wireless manner includes but is not limited to a wireless network (for example, Bluetooth, wireless fidelity (Wi-Fi), or ZigBee), an infrared, and the like; and the wired manner includes but is not limited to a wired network, a universal serial bus (USB), a serial port, and the like.

The intelligent hardware 140 is a hardware device that has functions of establishing a communication connection to another device and performing a human computer interaction with a user. The communication connection may be established in a wired manner or a wireless manner. In addition, a form of the human computer interaction may be collecting relevant information of the user, receiving relevant information of the user, feeding back relevant information to the user, or the like. For example, the intelligent hardware 140 may be an intelligent camera, an intelligent gamepad, an intelligent drone, an intelligent car, or an intelligent toy (for example, an intelligent toy that has a function such as throwing cakes, spraying water, discharging, making noise, or flashing light).

During actual application, the anchor client and the viewer client may be two clients having different functions. The anchor client has functions of collecting and publishing live streaming data, and the viewer client has functions of downloading and playing live streaming data. Alternatively, the anchor client and the viewer client may be two clients having same functions, and the client has functions of collecting, publishing, downloading and playing live streaming data. When the client is configured to implement a function at an anchor client side in a system/method example of this application, the client is used as the anchor client; and when the client is configured to implement a function at a viewer client side in the system/method example of this application, the client is used as the viewer client. Correspondingly, both the anchor terminal and the viewer terminal are terminal devices. When the client running on the terminal device is configured to implement the function at the anchor client side in the system/method example of this application, the terminal device is used as the anchor terminal; and when the client running on the terminal device is configured to implement the function at the viewer client side in the system/method example of this application, the terminal device is used as the viewer terminal.

Figure 2:
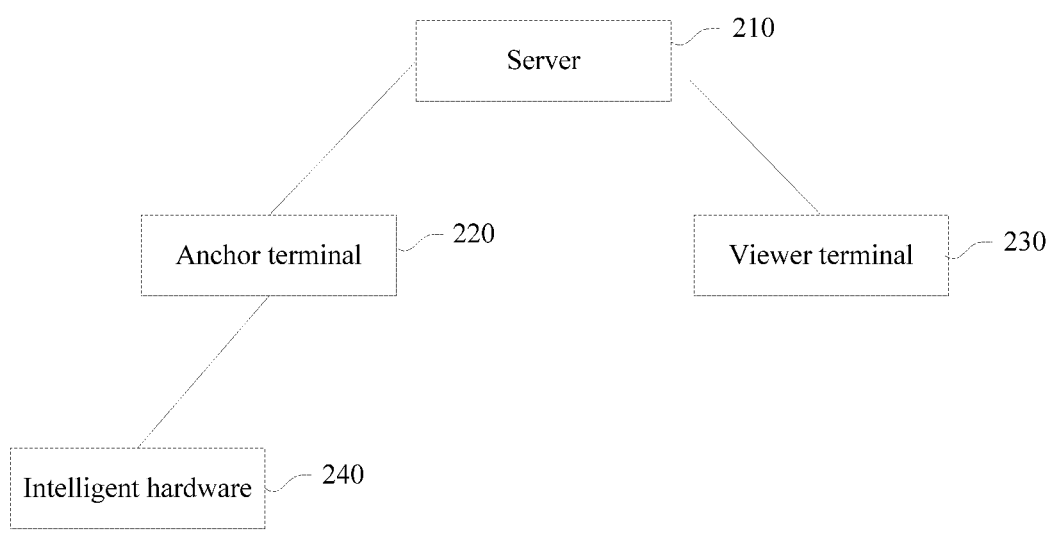
FIG. 2 is a block diagram of a live streaming interaction system according to an embodiment of this application.

FIG. 2 is a block diagram of a live streaming interaction system according to an embodiment of this application. The live streaming interaction system may also be referred to as a video streaming system. The live streaming interaction system may include: a server 210, an anchor terminal 220 and at least one viewer terminal 230 that have a first communication connection to the server 210, and intelligent hardware 240 having a second communication connection to the anchor terminal 220.

The viewer terminal 230 is configured to send a first control request corresponding to the intelligent hardware 240 to the server 210.

The first control request is used for requesting to control the intelligent hardware 240. Optionally, the first control request is generated by the viewer terminal 230 after an operation signal that is triggered by a viewer user and that corresponds to a control panel of the intelligent hardware 240 is received. When the viewer user triggers any function control on the control panel of the intelligent hardware 240, the viewer terminal 230 obtains an operation signal corresponding to the function control, and generates the first control request corresponding to the intelligent hardware 240 according to the operation signal. The first control request carries a control parameter, and the control parameter is determined by the viewer terminal 230 according to the operation signal.

The control panel of the intelligent hardware 240 is configured to control the intelligent hardware 240. Intelligent hardware 240 of different types and models usually has different control panels. For example, when the intelligent hardware 240 is an intelligent camera, a control panel of the intelligent camera may include: a control parameter used for adjusting an angle of the camera, a control parameter used for adjusting a focal length of the camera, a function control configured to turn on/off the camera, and the like. For another example, when the intelligent hardware 240 is an intelligent drone, a control panel of the intelligent drone may include: a control parameter used for adjusting a flight altitude of the intelligent drone, a control parameter used for adjusting a flight path of the intelligent drone, an intelligent control configured to adjust a camera angle of the intelligent drone, an intelligent control configured to adjust a camera focal length of the intelligent drone, and the like.

Optionally, the anchor terminal 220 is further configured to obtain a model of the intelligent hardware 240 and send the model of the intelligent hardware 240 to the server 210; the server 210 is further configured to obtain a control panel corresponding to the model of the intelligent hardware 240 and send the control panel to the viewer terminal 230; and the viewer terminal 230 is further configured to: receive the control panel, obtain the operation signal corresponding to the control panel, and generate the first control request corresponding to the intelligent hardware 240 according to the operation signal.

The server 210 stores a predetermined correspondence, and the predetermined correspondence includes a correspondence between a model of intelligent hardware 240 and a control panel of intelligent hardware 240. The model of the intelligent hardware 240 refers to a number used for identifying the intelligent hardware 240, and different intelligent hardware 240 has different models. Generally, intelligent hardware 240 of a same model has a same control panel, and intelligent hardware 240 of different models has different control panels. After receiving the model of the intelligent hardware 240 sent by the anchor terminal 220, the server 210 queries the predetermined correspondence to obtain the control panel corresponding to the model of the intelligent hardware 240.

In addition, in this embodiment of this application, an occasion to obtain and send the model of the intelligent hardware 240 by the anchor terminal 220 is not limited. In an example, after the anchor terminal 220 establishes the second communication connection to the intelligent hardware 240, the anchor terminal 220 actively obtains the model of the intelligent hardware 240 and reports the model of the intelligent hardware 240 to the server 210.

An example in which the server 210 stores the predetermined correspondence is used only for description in the foregoing. In another possible implementation, the predetermined correspondence may alternatively be stored in the anchor terminal 220. After obtaining the model of the intelligent hardware 240, the anchor terminal 220 queries the predetermined correspondence to obtain the control panel corresponding to the model of the intelligent hardware 240, and sends the control panel of the intelligent hardware 240 to the server 210. In addition, alternatively, the intelligent hardware 240 may store the control panel of the intelligent hardware 240, and after obtaining the control panel of the intelligent hardware 240, the anchor terminal 220 sends the control panel of the intelligent hardware 240 to the server 210. In the two cases, the anchor terminal 220 does not need to report the model of the intelligent hardware 240 to the server 210.

Alternatively, in an alternative solution, the viewer terminal 230 may store the predetermined correspondence. In this case, after obtaining the model of the intelligent hardware 240, the anchor terminal 220 sends the model of the intelligent hardware 240 to the server 210; the server 210 forwards the model of the intelligent hardware 240 to the viewer terminal 230; and the viewer terminal 230 queries the predetermined correspondence according to the model of the intelligent hardware 240 received from the server 210, to obtain the control panel corresponding to the model of the intelligent hardware 240.

Alternatively, a third-party server may store the predetermined correspondence. In this case, after obtaining the model of the intelligent hardware 240, the anchor terminal 220 sends the model of the intelligent hardware 240 to the server 210; the server 210 forwards the model of the intelligent hardware 240 to the viewer terminal 230; and the viewer terminal 230 obtains, according to the model of the intelligent hardware 240 received from the server 210, the control panel corresponding to the model of the intelligent hardware 240 from the third-party server that stores the predetermined correspondence.

It may be understood that, storing the control panel of the intelligent hardware by the intelligent hardware may save storage resources and processing resources of the server 210 and the anchor terminal 220; storing the predetermined correspondence in the anchor terminal 220 may save the storage resource and the processing resource of the server; storing the predetermined correspondence in the server 210 can save the storage resource and the processing resource of the anchor terminal 220; and storing the predetermined correspondence in the viewer terminal 230 or the third-party server can reduce a bandwidth resource and time required for communication between devices because content transferred by using information is relatively less, so as to improve an information transmission speed and efficiency.

After receiving the control panel of the intelligent hardware 240, the viewer terminal 230 displays the control panel of the intelligent hardware 240. Optionally, the viewer terminal 230 displays the control panel of the intelligent hardware 240 when displaying a live streaming image corresponding to the anchor terminal 220. In a process of viewing live streaming of the anchor user, the viewer user can control the intelligent hardware 240 by using the control panel, so that a brand new live streaming interaction form between the viewer user and the anchor user is implemented. The server 210 is configured to: receive the first control request that is sent by the viewer terminal 230 and that corresponds to the intelligent hardware 240, generate a to-be-sent second control request according to the first control request, and send the second control request to the anchor terminal 220.

Optionally, the server 210 is configured to: determine, when receiving one first control request within a predetermined time period, the first control request as the second control request; and generate, when receiving at least two first control requests within the predetermined time period, the second control request according to the at least two first control requests.

The server 210 ends receiving the first control request after the predetermined time period since starting to receive the first control request. Duration of the predetermined time period may be determined by the server 210 according to default configuration, or may be determined by the server 210 according to an instruction of the anchor terminal 220. For example, the duration of the predetermined time period is 3 minutes. In addition, the server 210 may use, as a time point of starting to receive the first control request, a time point at which the $1^{st}$ first control request corresponding to the anchor terminal 220 is received, or may determine, according to an instruction of the anchor terminal 220, a time point of starting to receive the first control request.

Optionally, when receiving the at least two first control requests within the predetermined time period, the server 210 generates the second control request in the following manner:

In a first possible implementation, the server 210 is configured to: obtain a control parameter carried in each of the first control requests; determine an integrated control parameter according to the control parameter carried in each of the first control requests; and generate the second control request carrying the integrated control parameter.

A corresponding control parameter varies for intelligent hardware 240 of different models. The control parameter is used for indicating an operation that the intelligent hardware needs to perform. For example, when the intelligent hardware 240 is an intelligent camera, a corresponding control parameter may be a control parameter used for adjusting an angle of the camera (for example, rotating the camera leftwards by 5 degrees), or a control parameter used for adjusting a focal length of the camera (for example, scaling up the focal length by twofold), or the like. For another example, when the intelligent hardware 240 is an intelligent drone, a corresponding control parameter may be a control parameter used for adjusting a flight altitude of the intelligent drone (for example, the intelligent drone ascends by 20 centimeters), or a control parameter used for adjusting a flight path of the intelligent drone (for example, the intelligent drone flies eastwards), or the like.

In an example, the server 210 is configured to: when the control parameter is represented in a scalar form, calculate an average value of the control parameters carried in the first control requests, and use the average value as the integrated control parameter. Control parameters such as a distance, a focal length, a force, a time, an angle, and a speed are represented in the scalar form. For example, assuming that the server 210 receives two first control requests, a control parameter carried in one first control request is driving forwards by 1 meter, and a control parameter carried in the other first control request is driving forwards by 3 meters, the control parameters carried in the two first control requests are averaged, to obtain an integrated control parameter of driving forwards by 2 meters.

In another example, the server 210 is configured to: when the control parameter is represented in a vector form, perform a vector operation on the control parameters carried in the first control requests, to obtain the integrated control parameter. A vector is a physical quantity that has magnitude and direction, and combines direction information and a scalar. For example, assuming that the server 210 receives two first control requests, a control parameter carried in one first control request is flying upwards, and a control parameter carried in the other first control request is flying leftwards, the vector operation is performed on the control parameters carried in the two first control requests, to obtain an integrated control parameter of flying towards the upper left.

In a second possible implementation, the server 210 is configured to: obtain a control parameter carried in each of the first control requests; count a quantity of control parameters of each type, to obtain a counting result; and generate the second control request according to the counting result.

Optionally, the server 210 generates a second control request carrying a control parameter that is the largest in quantity. For example, assuming that the server 210 receives five first control requests, control parameters carried in three of the first control requests are flying upwards, and control parameters carried in the other two first control requests are flying downwards, a control parameter carried in a second control request generated by the server 210 is flying upwards.

In the foregoing manner, control parameters of all viewer users are integrated to determine the integrated control parameter, or control parameters of most viewer users are determined as an actually sent control parameter, so that a huge quantity of users jointly determine the operation performed by the intelligent hardware 240.

Optionally, before determining the to-be-sent second control request, the server 210 is further configured to: detect whether a user account corresponding to the viewer terminal 230 has control permission; perform the step of determining a to-be-sent second control request according to the first control request if the user account corresponding to the viewer terminal 230 has the control permission; and skip performing the step of determining a to-be-sent second control request according to the first control request, that is, end the procedure, if the user account corresponding to the viewer terminal 230 has no control right.

The control permission is permission to control the intelligent hardware 240. Whether the user account has the control permission may be determined by the server 210 according to factors such as a level of the user account, cumulative duration of viewing live streaming, and a cumulative consumption amount during viewing live streaming. This is not limited in this embodiment of this application.

In addition, when receiving at least two first control requests within the predetermined time period, the server 210 is configured to: detect whether a user account corresponding to a viewer terminal 230 that sends each first control request has the control permission; select a first control request sent by a user account having the control permission; if the user account having the control permission sends one first control request, determine the first control request as the second control request; and if the user account having the control permission sends at least two first control requests, generate the second control request according to the at least two first control requests.

Optionally, when there are at least two second control requests, the server 210 is further configured to: determine a sending sequence of the at least two second control requests, and sequentially send the second control requests to the anchor terminal 220 one by one according to the sending sequence. For example, the server 210 determines the sending sequence according to a generation time point of each second control request, to enable a second control request generated earlier to be preferentially processed. In addition, the server 210 may send a second control request, and then send a next second control request after predetermined duration. The predetermined duration is determined according to an actual requirement, and for example, is 5 seconds, 10 seconds, or 20 seconds. Alternatively, the server 210 may send a second control request, and then wait for an execution complete response corresponding to the second control request. After receiving the execution complete response that is sent by the anchor terminal 220 and that corresponds to the second control request, the server 210 sends a next second control request to the anchor terminal 220. The execution complete response is used for indicating that execution of the second control request is complete.

The anchor terminal 220 is configured to: receive the second control request sent by the server 210, and forward the second control request to the intelligent hardware 240. The anchor terminal 220 forwards the second control request to the intelligent hardware 240 by using the second communication connection.

The intelligent hardware 240 is configured to perform a corresponding operation according to the second control request.

For example, the intelligent hardware 240 includes at least one of an intelligent camera, an intelligent gamepad, an intelligent drone, an intelligent car, and an intelligent toy.

Different intelligent hardware 240 can perform different operations. For example, when the intelligent hardware 240 is an intelligent camera, assuming that a control parameter carried in a second control request received by the intelligent camera is rotating the camera leftwards by 5 degrees, the intelligent camera controls an angle of the camera to rotate leftwards by 5 degrees. For another example, when the intelligent hardware 240 is an intelligent drone, assuming that a control parameter carried in a second control request received by the intelligent drone is flying upwards by 20 centimeters, the intelligent drone controls a flight altitude of the intelligent drone to increase by 20 centimeters.

Optionally, when the intelligent hardware 240 is an intelligent toy (for example, an intelligent tricky toy that has a function such as throwing cakes, spraying water, discharging, emitting noise, or flashing), the viewer user can remotely control the intelligent toy in a process of viewing live streaming, to interact with the anchor user, thereby improving richness and fun of live streaming content.

In conclusion, in the live streaming interaction system provided in this embodiment of this application, the intelligent hardware connected to the anchor terminal is added, so that in a live streaming process of the anchor user, the viewer user can remotely control the intelligent hardware by using the viewer terminal. Compared with the related technology in which a viewer terminal is only configured to passively receive live streaming data, in this embodiment of this application, the viewer user can send a control instruction to the intelligent hardware by using the viewer terminal, to remotely control the intelligent hardware and interact with the anchor user by using the intelligent hardware, thereby enriching live streaming interaction forms, improving an interaction effect in the live streaming process, and increasing user stickiness.

In addition, right detection is performed on the user account corresponding to the viewer terminal that sends the first control request, to allow only the user account that has the control permission to control the intelligent hardware, so that a quantity of interaction times is effectively controlled, security of remote control of the intelligent hardware is improved, and the interaction between the viewer user and the anchor user is more orderly and standardized.

In addition, the control parameters of all viewer users are integrated to determine the integrated control parameter, or the control parameters of most viewer users are determined as an actually sent control parameter, so that a huge quantity of users jointly determine the operation performed by the intelligent hardware.

Figure 3:
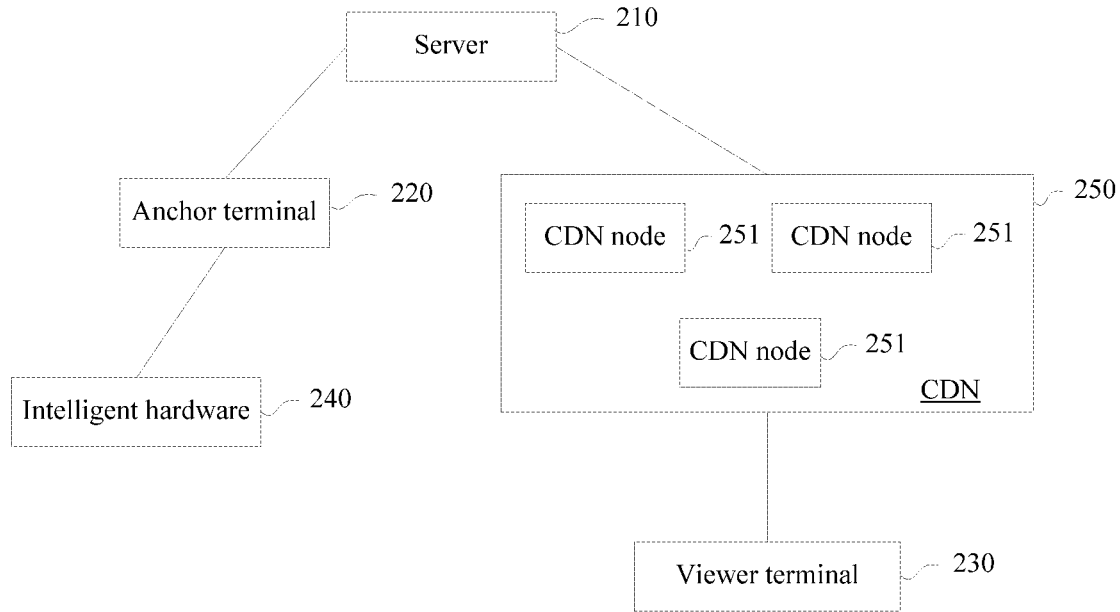
FIG. 3 is a block diagram of another live streaming interaction system according to an embodiment of this application.

Referring to FIG. 3, during actual implementation, a CDN 250 may be deployed between a server 210 and a viewer terminal 230. The CDN 250 includes a plurality of CDN nodes 251, and the plurality of CDN nodes 251 is deployed in a distributed manner. The server 210 delivers live streaming data to the plurality of CDN nodes 251, for example, a CDN node 251 that is closest to the viewer terminal 230, and the viewer terminal 230 obtains the live streaming data from the CDN node 251 that is closest to the viewer terminal 230, which helps alleviating a load pressure of the server 210.

However, when the server 210 sends the live streaming data to the viewer terminal 230 by using the CDN 250, because the live streaming data needs to be forwarded by the CDN 250, a data transmission delay is inevitably increased. Usually, the data transmission delay may reach 2 seconds. In this case, after sending a first control request by using the viewer terminal 230, a viewer user can view, in a live streaming image after a relatively long delay (longer than 2 seconds), an operation performed by intelligent hardware 240.

To resolve the foregoing situation, in this embodiment of this application, the server 210 is further configured to: after determining a to-be-sent second control request according to the first control request, send a switching instruction to a viewer terminal 230 related to the second control request, the switching instruction being used for instructing the viewer terminal 230 to directly obtain live streaming data of an anchor terminal 220 from the server 210; receive a data obtaining request sent by the viewer terminal 230 related to the second control request; and send the live streaming data of the anchor terminal 220 to the viewer terminal 230 related to the second control request according to the data obtaining request.

The viewer terminal 230 related to the second control request is a viewer terminal 230 that sends, to the server 210, a first control request in which a carried control parameter is used. For example, when the server 210 directly determines the first control request as the second control request, the viewer terminal 230 related to the second control request is the viewer terminal 230 that sends the first control request; and for another example, when the server 210 generates the second control request according to at least two first control requests, the viewer terminal 230 related to the second control request is viewer terminals that send the at least two first control requests.

In this embodiment of this application, after receiving the switching instruction, the viewer terminal does not obtain the live streaming data of the anchor terminal from the CDN, but directly requests to obtain the live streaming data of the anchor terminal from the server. The server directly sends the live streaming data to the viewer terminal without forwarding by the CDN. Therefore, a transmission delay of the live streaming data will be reduced (for example, reduced from 2 seconds to 500-800 milliseconds), thereby reducing a delay of a time period between sending the control request by the viewer user and viewing the intelligent hardware performing an operation.

In addition, a viewer terminal that is not related to the second control request still obtains the live streaming data of the anchor terminal from the CDN.

Figure 4:
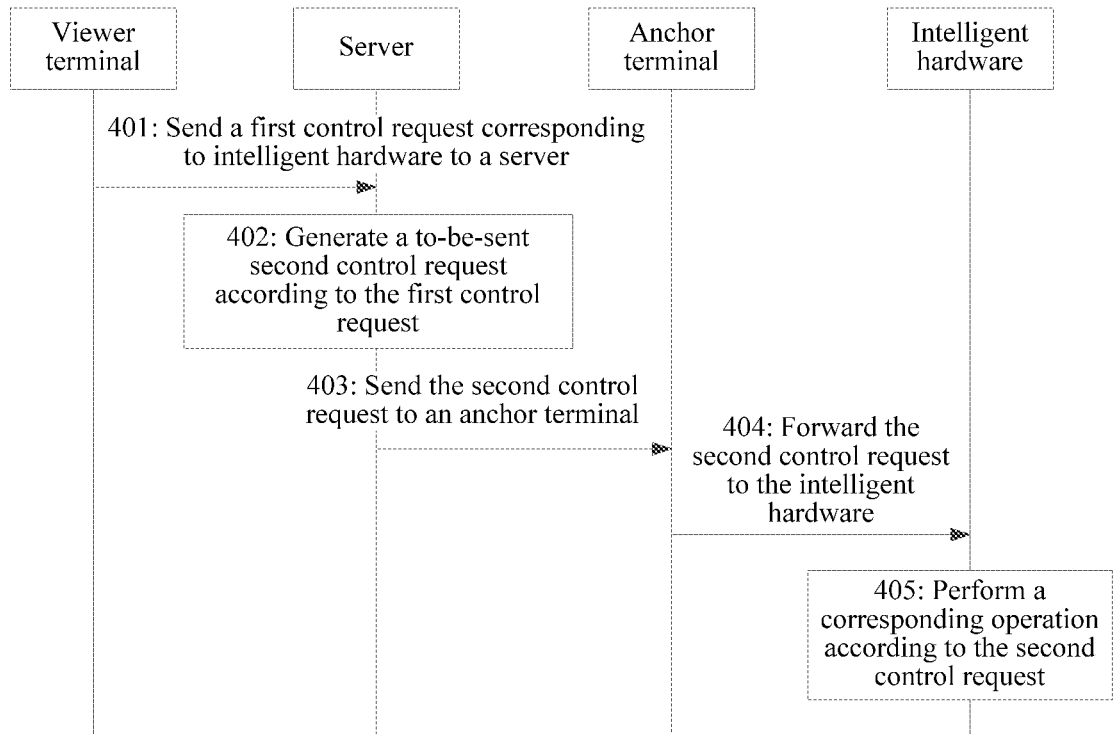
FIG. 4 is a flowchart of a live streaming interaction method according to an embodiment of this application.

FIG. 4 is a flowchart of another live streaming interaction method according to an embodiment of this application. The live streaming interaction method may be applied to the implementation environment shown in FIG. 1. The live streaming interaction method may include the following steps:

Step 401: A viewer terminal sends a first control request corresponding to intelligent hardware to a server.

Correspondingly, the server receives the first control request that is sent by the viewer terminal and that corresponds to the intelligent hardware.

The first control request is used for requesting to control the intelligent hardware. Optionally, the first control request is generated by the viewer terminal after an operation signal that is triggered by a viewer user and that corresponds to a control panel of the intelligent hardware is received. When the viewer user triggers any function control on the control panel of the intelligent hardware, the viewer terminal obtains an operation signal corresponding to the function control, and generates the first control request corresponding to the intelligent hardware according to the operation signal. The first control request carries a control parameter, and the control parameter is determined by the viewer terminal according to the operation signal.

The control panel of the intelligent hardware is configured to control the intelligent hardware. Intelligent hardware of different types and models usually has different control panels. For example, when the intelligent hardware is an intelligent camera, a control panel of the intelligent camera may include: a control parameter used for adjusting an angle of the camera, a control parameter used for adjusting a focal length of the camera, a function control configured to turn on/off the camera, and the like. For another example, when the intelligent hardware is an intelligent drone, a control panel of the intelligent drone may include: a control parameter used for adjusting a flight altitude of the intelligent drone, a control parameter used for adjusting a flight path of the intelligent drone, an intelligent control configured to adjust a camera angle of the intelligent drone, an intelligent control configured to adjust a camera focal length of the intelligent drone, and the like.

Optionally, before step 401, the method further includes the following steps:

1: An anchor terminal obtains a model of the intelligent hardware.

The model of the intelligent hardware refers to a number used for identifying the intelligent hardware, and different intelligent hardware has different models. Generally, intelligent hardware of a same model has a same control panel, and intelligent hardware of different models has different control panels.

2: The anchor terminal sends the model of the intelligent hardware to the server.

Correspondingly, the server receives the model of the intelligent hardware sent by the anchor terminal.

In this embodiment of this application, an occasion to obtain and send the model of the intelligent hardware by the anchor terminal is not limited. In an example, after the anchor terminal establishes a second communication connection to the intelligent hardware, the anchor terminal actively obtains the model of the intelligent hardware and reports the model of the intelligent hardware to the server.

3: The server obtains a control panel corresponding to the model of the intelligent hardware.

After receiving the model of the intelligent hardware sent by the anchor terminal, the server queries a predetermined correspondence to obtain the control panel corresponding to the model of the intelligent hardware. The server stores the predetermined correspondence, and the predetermined correspondence includes a correspondence between a model of intelligent hardware and a control panel of intelligent hardware.

4: The server sends the control panel of the intelligent hardware to the viewer terminal.

Correspondingly, the viewer terminal receives the control panel of the intelligent hardware sent by the server.

After receiving the control panel of the intelligent hardware, the viewer terminal displays the control panel of the intelligent hardware. Optionally, the viewer terminal displays the control panel of the intelligent hardware when displaying a live streaming image corresponding to the anchor terminal. In a process of viewing live streaming of an anchor user, the viewer user can control the intelligent hardware by using the control panel, so that a brand new live streaming interaction form between the viewer user and the anchor user is implemented.

5: The viewer terminal obtains an operation signal corresponding to the control panel.

When the viewer user triggers any function control on the control panel of the intelligent hardware, the viewer terminal obtains the operation signal corresponding to the function control.

6: The viewer terminal generates the first control request corresponding to the intelligent hardware according to the operation signal.

The first control request carries the control parameter, and the control parameter is determined by the viewer terminal according to the operation signal.

An example in which the server stores the predetermined correspondence is used only for description in the foregoing. In another possible implementation, the predetermined correspondence may alternatively be stored in the anchor terminal. In this case, after obtaining the model of the intelligent hardware, the anchor terminal queries the predetermined correspondence to obtain the control panel corresponding to the model of the intelligent hardware, and sends the control panel of the intelligent hardware to the server. Storing the predetermined correspondence in the server can save a storage resource and a processing resource of the anchor terminal. In addition, alternatively, the intelligent hardware may store the control panel of the intelligent hardware. In this case, after obtaining the control panel of the intelligent hardware, the anchor terminal sends the control panel of the intelligent hardware to the server. Alternatively, the viewer terminal may store the predetermined correspondence. In this case, after obtaining the model of the intelligent hardware, the anchor terminal sends the model of the intelligent hardware to the server; the server forwards the model of the intelligent hardware to the viewer terminal; and the viewer terminal queries the predetermined correspondence according to the model of the intelligent hardware received from the server, to obtain the control panel corresponding to the model of the intelligent hardware. As described above, different implementations may generate the technical effect, and during actual application, flexible setting may be performed according to an actual situation of the system.

Step 402: The server generates a to-be-sent second control request according to the first control request.

Optionally, when the server receives one first control request within a predetermined time period, the server determines the first control request as the second control request; and when the server receives at least two first control requests within the predetermined time period, the server generates the second control request according to the at least two first control requests.

The server ends receiving the first control request after the predetermined time period since starting to receive the first control request. Duration of the predetermined time period may be determined by the server according to default configuration, or may be determined by the server according to an instruction of the anchor terminal. For example, the duration of the predetermined time period is 3 minutes. In addition, the server may use, as a time point of starting to receive the first control request, a time point at which the $1^{st}$ first control request corresponding to the anchor terminal is received, or may determine, according to an instruction of the anchor terminal, a time point of starting to receive the first control request.

When receiving the at least two first control requests within the predetermined time period, the server generates the second control request in the following manner:

In a first possible implementation, the server obtains a control parameter carried in each of the first control requests; determines an integrated control parameter according to the control parameter carried in each of the first control requests; and generates the second control request carrying the integrated control parameter.

A corresponding control parameter varies for intelligent hardware of different models. The control parameter is used for indicating an operation that the intelligent hardware needs to perform. For example, when the intelligent hardware is an intelligent camera, a corresponding control parameter may be a control parameter used for adjusting an angle of the camera (for example, rotating the camera leftwards by 5 degrees), or a control parameter used for adjusting a focal length of the camera (for example, scaling up the focal length by twofold), or the like. For another example, when the intelligent hardware is an intelligent drone, a corresponding control parameter may be a control parameter used for adjusting a flight altitude of the intelligent drone (for example, the intelligent drone ascends by 20 centimeters), or a control parameter used for adjusting a flight path of the intelligent drone (for example, the intelligent drone flies eastwards), or the like.

In an example, when the control parameter is represented in a scalar form, the server calculates an average value of the control parameters carried in the first control requests, and uses the average value as the integrated control parameter. Control parameters such as a distance, a focal length, a force, a time, an angle, and a speed are represented in the scalar form. For example, assuming that the server receives two first control requests, a control parameter carried in one first control request is driving forwards by 1 meter, and a control parameter carried in the other first control request is driving forwards by 3 meters, the control parameters carried in the two first control requests are averaged, to obtain an integrated control parameter of driving forwards by 2 meters.

In another example, when the control parameter is represented in a vector form, the server performs a vector operation on the control parameters carried in the first control requests, to obtain the integrated control parameter. A vector is a physical quantity that has magnitude and direction, and combines direction information and a scalar. For example, assuming that the server receives two first control requests, a control parameter carried in one first control request is flying upwards, and a control parameter carried in the other first control request is flying leftwards, the vector operation is performed on the control parameters carried in the two first control requests, to obtain an integrated control parameter of flying towards the upper left.

In a second possible implementation, the server obtains a control parameter carried in each of the first control requests; counts a quantity of control parameters of each type, to obtain a counting result; and generates the second control request according to the counting result.

Optionally, the server generates a second control request carrying a control parameter that is the largest in quantity. For example, assuming that the server receives five first control requests, control parameters carried in three of the first control requests are flying upwards, and control parameters carried in the other two first control requests are flying downwards, a control parameter carried in a second control request generated by the server is flying upwards.

In the foregoing manner, control parameters of all viewer users are integrated to determine the integrated control parameter, or control parameters of most viewer users are determined as an actually sent control parameter, so that a huge quantity of users jointly determine the operation performed by the intelligent hardware.

Optionally, before determining the to-be-sent second control request, the server is further configured to: detect whether a user account corresponding to the viewer terminal has control permission; perform the step of determining a to-be-sent second control request according to the first control request if the user account corresponding to the viewer terminal has the control permission; and skip performing the step of determining a to-be-sent second control request according to the first control request, that is, end the procedure, if the user account corresponding to the viewer terminal has no control right.

The control permission is permission to control the intelligent hardware.

Whether the user account has the control permission may be determined by the server according to factors such as a level of the user account, cumulative duration of viewing live streaming, and a cumulative consumption amount during viewing live streaming. This is not limited in this embodiment of this application.

In addition, when receiving at least two first control requests within the predetermined time period, the server detects whether a user account corresponding to a viewer terminal that sends each first control request has the control permission; selects a first control request sent by a user account having the control permission; if the user account having the control permission sends one first control request, determines the first control request as the second control request; and if the user account having the control permission sends at least two first control requests, generates the second control request according to the at least two first control requests.

Step 403: The server sends the second control request to the anchor terminal.

Correspondingly, the anchor terminal receives the second control request sent by the server.

Optionally, when there are at least two second control requests, the server determines a sending sequence of the at least two second control requests, and sequentially sends the second control requests to the anchor terminal one by one according to the sending sequence. For example, the server determines the sending sequence according to a generation time point of each second control request, to enable a second control request generated earlier to be preferentially processed.

In addition, the server may send a second control request, and then send a next second control request after predetermined duration. The predetermined duration is determined according to an actual requirement, and for example, is 5 seconds, 10 seconds, or 20 seconds. Alternatively, the server may send a second control request, and then wait for an execution complete response corresponding to the second control request. After receiving the execution complete response that is sent by the anchor terminal and that corresponds to the second control request, the server sends a next second control request to the anchor terminal. The execution complete response is used for indicating that execution of the second control request is complete.

Step 404: The anchor terminal forwards the second control request to the intelligent hardware.

The anchor terminal forwards the second control request to the intelligent hardware by using the second communication connection.

Correspondingly, the intelligent hardware receives the second control request forwarded by the anchor terminal.

Step 405: The intelligent hardware performs a corresponding operation according to the second control request.

For example, the intelligent hardware includes at least one of an intelligent camera, an intelligent gamepad, an intelligent drone, an intelligent car, and an intelligent toy.

Different intelligent hardware can perform different operations. For example, when the intelligent hardware is an intelligent camera, assuming that a control parameter carried in a second control request received by the intelligent camera is rotating the camera leftwards by 5 degrees, the intelligent camera controls an angle of the camera to rotate leftwards by 5 degrees. For another example, when the intelligent hardware is an intelligent drone, assuming that a control parameter carried in a second control request received by the intelligent drone is flying upwards by 20 centimeters, the intelligent drone controls a flight altitude of the intelligent drone to increase by 20 centimeters.

Optionally, when the intelligent hardware is an intelligent toy (for example, an intelligent tricky toy that has a function such as throwing cakes, spraying water, discharging, emitting noise, or flashing), the viewer user can remotely control the intelligent toy in a process of viewing live streaming, to interact with the anchor user, thereby improving richness and fun of live streaming content.

Optionally, after step 402, the method further includes the following steps:

1: The server sends a switching instruction to a viewer terminal related to the second control request, the switching instruction being used for instructing the viewer terminal to directly obtain live streaming data of the anchor terminal from the server.

2: The server receives a data obtaining request sent by the viewer terminal related to the second control request.

3: The server sends the live streaming data of the anchor terminal to the viewer terminal related to the second control request according to the data obtaining request.

The viewer terminal related to the second control request is a viewer terminal that sends, to the server, a first control request in which a carried control parameter is used. For example, when the server directly determines the first control request as the second control request, the viewer terminal related to the second control request is the viewer terminal that sends the first control request; and for another example, when the server generates the second control request according to at least two first control requests, the viewer terminal related to the second control request is viewer terminals that send the at least two first control requests.

In this embodiment of this application, after receiving the switching instruction, the viewer terminal does not obtain the live streaming data of the anchor terminal from a CDN, but directly requests to obtain the live streaming data of the anchor terminal from the server. The server directly sends the live streaming data to the viewer terminal without forwarding by the CDN. Therefore, a transmission delay of the live streaming data will be reduced (for example, reduced from 2 seconds to 500-800 milliseconds), thereby reducing a delay of a time period between sending the control request by the viewer user and viewing the intelligent hardware performing an operation.

In addition, a viewer terminal that is not related to the second control request still obtains the live streaming data of the anchor terminal from the CDN.

It should be noted that the server, the viewer terminal, the anchor terminal, and the like may all be implemented by using a computing device.

In conclusion, in the live streaming interaction method provided in this embodiment of this application, the intelligent hardware connected to the anchor terminal is added, so that in a live streaming process of the anchor user, the viewer user can remotely control the intelligent hardware by using the viewer terminal. Compared with the related technology in which a viewer terminal is only configured to passively receive live streaming data, in this embodiment of this application, the viewer user can send a control instruction to the intelligent hardware by using the viewer terminal, to interact with the anchor user by using the intelligent hardware, thereby enriching live streaming interaction forms, improving an interaction effect in the live streaming process, and increasing user stickiness.

For details not disclosed in the foregoing method embodiment, refer to the system embodiments of this application.

In the foregoing method embodiment, description is only provided from a perspective of interaction between a plurality of devices. The steps related to a server side may be independently implemented as a live streaming interaction method at the server side, the steps related to an anchor terminal side may be independently implemented as a live streaming interaction method at the anchor terminal side, the steps related to a viewer terminal side may be independently implemented as a live streaming interaction method at the viewer terminal side, and the steps related to an intelligent hardware side may be independently implemented as a live streaming interaction method at the intelligent hardware side.

The following is an apparatus embodiment of this application, which may be used to execute the method embodiment of this application. For details not disclosed in the apparatus embodiment of this application, refer to the method embodiment and the system embodiments of this application.

Figure 5:
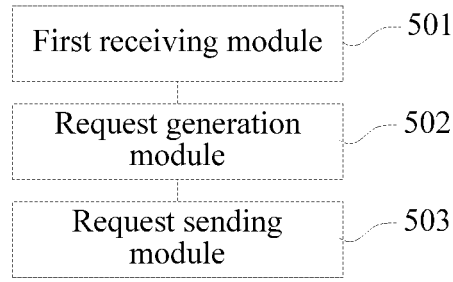
FIG. 5 is a block diagram of a live streaming interaction apparatus according to an embodiment of this application.

FIG. 5 is a block diagram of a live streaming interaction apparatus according to an embodiment of this application. The apparatus has functions of implementing the server side in the foregoing method example. The functions may be implemented by using hardware, or may be implemented by hardware executing corresponding software. The apparatus may include: a first receiving module 501, a request generation module 502, and a request sending module 503.

The first receiving module 501 is configured to receive a first control request corresponding to intelligent hardware that is sent by a viewer terminal.

The request generation module 502 is configured to perform the foregoing step 402.

The request sending module 503 is configured to perform the foregoing step 403.

Optionally, the request generation module 502 is further configured to generate, when at least two first control requests are received within a predetermined time period, a second control request according to the at least two first control requests.

Optionally, the request generation module 502 is configured to:

obtain a control parameter carried in each of the first control requests;

determine an integrated control parameter according to the control parameter carried in each of the first control requests; and generate the second control request carrying the integrated control parameter; or obtain a control parameter carried in each of the first control requests; count a quantity of control parameters of each type, to obtain a counting result; and generate the second control request according to the counting result.

Optionally, the apparatus further includes: a permission detection module (not shown).

The permission detection module is configured to detect whether a user account corresponding to the viewer terminal has control permission, the control permission being permission to control the intelligent hardware.

Correspondingly, the request sending module 503 is further configured to determine the to-be-sent second control request according to the first control request if the user account corresponding to the viewer terminal has the control permission.

Optionally, the request sending module 503 includes: a sequence determining unit and a request sending unit (not shown).

The sequence determining unit is configured to determine a sending sequence of at least two second control requests.

The request sending unit is configured to sequentially send the second control requests to an anchor terminal one by one according to the sending sequence.

Optionally, the apparatus further includes: an instruction sending module, a second receiving module, and a data sending module (not shown).

A second sending module is configured to send a switching instruction to a viewer terminal related to the second control request, the switching instruction being used for instructing the viewer terminal to directly obtain live streaming data of the anchor terminal from the server.

The second receiving module is configured to receive a data obtaining request sent by the viewer terminal related to the second control request.

A third sending module is configured to send the live streaming data of the anchor terminal to the viewer terminal related to the second control request according to the data obtaining request.

Optionally, the apparatus further includes: a third receiving module, a panel obtaining module, and a panel sending module (not shown).

The third receiving module is configured to receive a model of the intelligent hardware sent by the anchor terminal.

The panel obtaining module is configured to obtain a control panel corresponding to the model of the intelligent hardware, the control panel being configured to control the intelligent hardware.

The panel sending module is configured to send the control panel to the viewer terminal.

For related details, refer to the system embodiment shown in FIG. 2 or the method embodiment shown in FIG. 4.

It should be noted that: when the apparatus provided in the foregoing embodiment implements the functions of the apparatus, division of the foregoing function modules is only used as an example for description. In a practical application, the functions may be allocated to and completed by different function modules according to requirements. That is, an internal structure of the device is divided into different function modules, to complete all or some of the functions described above. In addition, the apparatus and system embodiments provided in the foregoing embodiments belong to a same conception. For a specific implementation process of the apparatus embodiment, refer to the system embodiment. Details are not described herein again.

Figure 6:
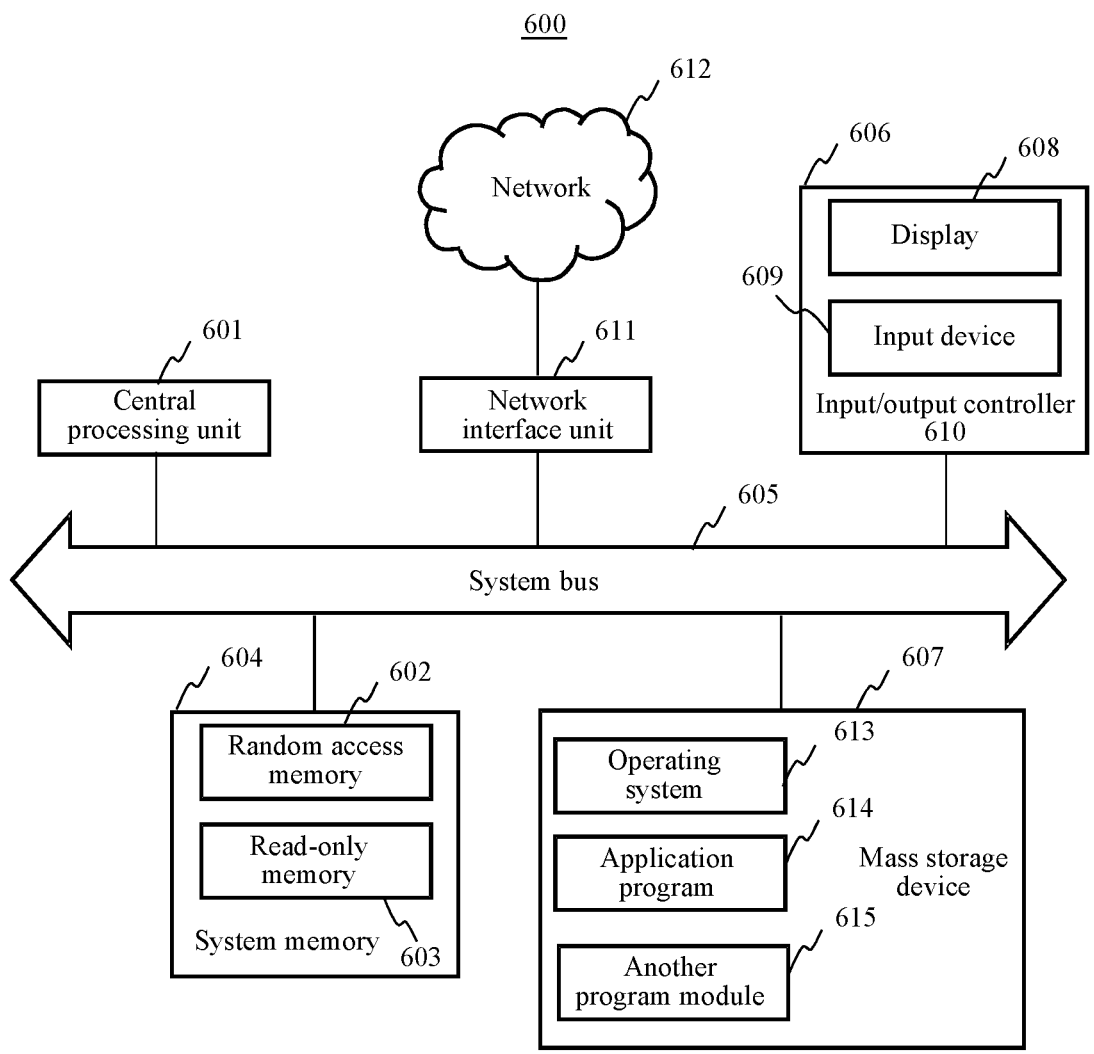
FIG. 6 is a schematic structural diagram of a server according to an embodiment of this application.

FIG. 6 is a schematic structural diagram of a server according to an embodiment of this application. The server is configured to implement the live streaming interaction method provided in the foregoing embodiment. Specifically:

A server 600 includes a central processing unit (CPU) 601, a system memory 604 including a random access memory (RAM) 602 and a read-only memory (ROM) 603, and a system bus 605 connecting the system memory 604 and the CPU 601. The server 600 further includes a basic input/output system (I/O system) 606 for transmitting information between components in a computer, and a mass storage device 607 configured to store an operating system 613, an application program 614, and another program module 615.

The basic I/O system 606 includes a display 608 configured to display information, and an input device 609 used by a user to input information, such as a mouse or a keyboard. The display 608 and the input device 609 are connected to the CPU 601 by using an input/output controller 610 connected to the system bus 605. The basic I/O system 606 may further include the input/output controller 610, to receive and process input from a plurality of other devices such as a keyboard, a mouse, and an electronic stylus. Similarly, the input/output controller 610 further provides output to a display screen, a printer, or another type of output device.

The mass storage device 607 is connected to the CPU 601 by using a mass storage controller (not shown) connected to the system bus 605. The mass storage device 607 and an associated computer-readable medium provide non-volatile storage for the server 600. That is, the mass storage device 607 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 604 and the mass storage device 607 may be collectively referred to as a memory.

According to the embodiments of this application, the server 600 may further be connected, through a network such as the Internet, to a remote computer on the network. That is, the server 600 may be connected to a network 612 by using a network interface unit 611 connected to the system bus 605, or may be connected to another type of network or a remote computer system (not shown) by using a network interface unit 611.

The memory further includes one or more programs. The one or more programs are stored in the memory and configured to be executed by one or more processors. The one or more programs include instructions used for performing the foregoing method at the server side.

In an exemplary embodiment, a non-transitory computer-readable storage medium including instructions is further provided, for example, a memory including instructions. The foregoing instructions are executed by a processor of a server to complete the steps at the server side in the foregoing method embodiment. For example, the non-transitory computer-readable storage medium may be a ROM, a RAM, a CD-ROM, a magnetic tape, a floppy disk, an optical data storage device, or the like.

It should be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Unless otherwise defined, the technical terms or scientific terms used herein should have general meanings understood by a person of ordinary skill in the field of this application. "First", "second" and similar terms used in the specification and the claims of this patent application do not indicate any sequence, quantity, or importance, but are only used to distinguish different components. Similarly, "one", "a", and similar terms also do not indicate a quantity limitation, but indicates that there is at least one. "Connection", "connected", and similar terms are not limited to a physical or mechanical connection, but may include an electrical connection, regardless of a direct or indirect connection.

The sequence numbers of the foregoing embodiments of this application are merely for description purpose and do not indicate the preference of the embodiments.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A live streaming interaction method performed at an anchor terminal having one or more processors and memory storing a plurality of programs to be executed by the one or more processors, wherein the anchor terminal has a first communication connection to a server, and a second communication connection to an intelligent hardware, the method comprising:
    receiving a second control request from the server via the first communication connection, wherein the server receives a first control request directed to the intelligent hardware from a viewer terminal and generates the second control request according to the first control request, generating the second control request further includes one or more of:
        detecting, by the server, whether a user account corresponding to the viewer terminal has permission to control the intelligent hardware, wherein the permission is determined by (i) a cumulative duration of viewing live streaming by the user account, or (ii) a cumulative consumption amount during viewing of living streaming by the user account and
        integrating control parameters extracted from the first control request from more than one viewer terminal associated with respective user accounts into an integrated control parameter associated with the second control request;
    forwarding the second control request to the intelligent hardware via the second communication connection, wherein the intelligent hardware performs a corresponding operation according to the second control request and returns live streaming data associated with the corresponding operation to the anchor terminal via the second communication connection; and
    forwarding the live streaming data to the viewer terminal via the first communication connection.

2. The live streaming interaction method according to claim 1, wherein the server is configured to:
    receive at least two first control requests within a predetermined time period; and
    generate the second control request according to the at least two first control requests.

3. The live streaming interaction method according to claim 2, wherein the server is configured to:
    obtain a control parameter carried in each of the first control requests;
    determine an integrated control parameter according to the control parameter carried in each of the first control requests; and
    generate the second control request carrying the integrated control parameter.

4. The live streaming interaction method according to claim 2, wherein the server is configured to:
    obtain a control parameter carried in each of the first control requests;
    count a quantity of control parameters of each type, to obtain a counting result; and
    generate the second control request according to the counting result.

5. The live streaming interaction method according to claim 1, wherein the server is further configured to:
    detect whether a user account corresponding to the viewer terminal has permission to control the intelligent hardware; and
    send the second control request according to the first control request if the user account corresponding to the viewer terminal has the control permission.

6. The live streaming interaction method according to claim 1, wherein the server is configured to:
    determine, when there are at least two second control requests, a sending sequence of the at least two second control requests; and
    sequentially send the second control requests to the anchor terminal one by one according to the sending sequence via the first communication connection.

7. The live streaming interaction method according to claim 1, wherein the server is further configured to:
    send a switching instruction to a viewer terminal related to the second control request after generating the second control request, the switching instruction being used for instructing the viewer terminal to directly obtain the live streaming data of the anchor terminal from the server;
    receive a data obtaining request sent by the viewer terminal related to the second control request; and
    send the live streaming data of the anchor terminal to the viewer terminal related to the second control request according to the data obtaining request.

8. A live streaming interaction system, comprising:
an anchor terminal;
a server that has a first communication connection to the anchor terminal; and
intelligent hardware that has a second communication connection to the anchor terminal, wherein the anchor terminal, the server and the intelligent hardware are configured to perform a plurality of operations comprising:
    receiving, by the server, a first control request directed to the intelligent hardware from a viewer terminal;
    generating by the server, a second control request according to the first control request, generating the second control request further includes one or more of:
        detecting, by the server, whether a user account corresponding to the viewer terminal has permission to control the intelligent hardware, wherein the permission is determined by (i) a cumulative duration of viewing live streaming by the user account, or (ii) a cumulative consumption amount during viewing of living streaming by the user account and
        integrating control parameters extracted from the first control request from more than one viewer terminal associated with respective user accounts into an integrated control parameter associated with the second control request;
    receiving, by the anchor terminal, the second control request from the server via the first communication connection;
    forwarding, by the anchor terminal, the second control request to the intelligent hardware via the second communication connection;
    performing, by the intelligent hardware, a corresponding operation according to the second control request;
    returning, by the intelligent hardware, live streaming data associated with the corresponding operation to the anchor terminal via the second communication connection; and
    forwarding, by the anchor terminal, the live streaming data to the viewer terminal via the first communication connection.

9. The live streaming interaction system according to claim 8, wherein the server is configured to:
    receive at least two first control requests within a predetermined time period; and generate the second control request according to the at least two first control requests.

10. The live streaming interaction system according to claim 9, wherein the server is configured to:
obtain a control parameter carried in each of the first control requests;
determine an integrated control parameter according to the control parameter carried in each of the first control requests; and
generate the second control request carrying the integrated control parameter.

11. The live streaming interaction system according to claim 9, wherein the server is configured to:
obtain a control parameter carried in each of the first control requests;
count a quantity of control parameters of each type, to obtain a counting result; and
generate the second control request according to the counting result.

12. The live streaming interaction system according to claim 8, wherein the server is configured to:
detect whether a user account corresponding to the viewer terminal has permission to control the intelligent hardware; and
send the second control request according to the first control request if the user account corresponding to the viewer terminal has the control permission.

13. The live streaming interaction system according to claim 8, wherein the server is configured to:
determine, when there are at least two second control requests, a sending sequence of the at least two second control requests; and
sequentially send the second control requests to the anchor terminal one by one according to the sending sequence via the first communication connection.

14. The live streaming interaction system according to claim 8, wherein the server is configured to:
send a switching instruction to a viewer terminal related to the second control request after generating the second control request, the switching instruction being used for instructing the viewer terminal to directly obtain the live streaming data of the anchor terminal from the server;
receive a data obtaining request sent by the viewer terminal related to the second control request; and
send the live streaming data of the anchor terminal to the viewer terminal related to the second control request according to the data obtaining request.

15. A non-transitory computer readable storage medium storing a plurality of machine readable instructions in connection with a live streaming interaction system including an anchor terminal, a server that has a first communication connection to the anchor terminal, and intelligent hardware that has a second communication connection to the anchor terminal, wherein the anchor terminal, the server and the intelligent hardware are configured to perform a plurality of operations comprising:
receiving, by the server, a first control request directed to the intelligent hardware from a viewer terminal;
generating by the server, a second control request according to the first control request, generating the second control request further includes one or more of:
detecting, by the server, whether a user account corresponding to the viewer terminal has permission to control the intelligent hardware, wherein the permission is determined by (i) a cumulative duration of viewing live streaming by the user account, or (ii) a cumulative consumption amount during viewing of living streaming by the user account and
integrating control parameters extracted from the first control request from more than one viewer terminal associated with respective user accounts into an integrated control parameter associated with the second control request;
receiving, by the anchor terminal, the second control request from the server via the first communication connection;
forwarding, by the anchor terminal, the second control request to the intelligent hardware via the second communication connection;
performing, by the intelligent hardware, a corresponding operation according to the second control request;
returning, by the intelligent hardware, live streaming data associated with the corresponding operation to the anchor terminal via the second communication connection; and
forwarding, by the anchor terminal, the live streaming data to the viewer terminal via the first communication connection.

16. The non-transitory computer readable storage medium according to claim 15, wherein the server is configured to:
receive at least two first control requests within a predetermined time period; and
generate the second control request according to the at least two first control requests.

17. The non-transitory computer readable storage medium according to claim 16, wherein the server is configured to:
obtain a control parameter carried in each of the first control requests;
determine an integrated control parameter according to the control parameter carried in each of the first control requests; and
generate the second control request carrying the integrated control parameter.

18. The non-transitory computer readable storage medium according to claim 15, wherein the server is configured to:
detect whether a user account corresponding to the viewer terminal has permission to control the intelligent hardware; and
send the second control request according to the first control request if the user account corresponding to the viewer terminal has the control permission.

19. The non-transitory computer readable storage medium according to claim 15, wherein the server is configured to:
determine, when there are at least two second control requests, a sending sequence of the at least two second control requests; and
sequentially send the second control requests to the anchor terminal one by one according to the sending sequence via the first communication connection.

20. The non-transitory computer readable storage medium according to claim 15, wherein the server is configured to:
send a switching instruction to a viewer terminal related to the second control request after generating the second control request, the switching instruction being used for instructing the viewer terminal to directly obtain the live streaming data of the anchor terminal from the server;
receive a data obtaining request sent by the viewer terminal related to the second control request; and
send the live streaming data of the anchor terminal to the viewer terminal related to the second control request according to the data obtaining request.

* * * * *